United States Patent
Chou

(10) Patent No.: US 11,003,263 B2
(45) Date of Patent: May 11, 2021

(54) WIRELESS CHARGING MOUSEPAD AND PROCESSES THEREOF

(71) Applicant: Hades-Gaming Corporation, New Taipei (TW)

(72) Inventor: Hung-Jen Chou, New Taipei (TW)

(73) Assignee: HADES-GAMING CORPORATION, New Taipei (TW)

(*) Notice: Subject to any disclaimer, the term of this patent is extended or adjusted under 35 U.S.C. 154(b) by 199 days.

(21) Appl. No.: 16/281,011

(22) Filed: Feb. 20, 2019

(65) Prior Publication Data

US 2020/0218369 A1 Jul. 9, 2020

(30) Foreign Application Priority Data

Jan. 7, 2019 (TW) ................. 108100572

(51) Int. Cl.
*G06F 3/039* (2013.01)
*H01F 38/14* (2006.01)
*H02J 7/02* (2016.01)
*G06F 1/26* (2006.01)

(52) U.S. Cl.
CPC ............ *G06F 3/0395* (2013.01); *G06F 1/266* (2013.01); *G06F 3/039* (2013.01); *H01F 38/14* (2013.01); *H02J 7/025* (2013.01)

(58) Field of Classification Search
CPC ........ G06F 3/0395; G06F 3/039; G06F 1/266; H01F 38/14; H02J 7/025
USPC ........................................................ 307/104
See application file for complete search history.

(56) References Cited

U.S. PATENT DOCUMENTS 10,622,828 B2* 4/2020 Chou ................. H01F 38/14

FOREIGN PATENT DOCUMENTS

| CN | 207182238 U | 4/2018 |
|---|---|---|
| CN | 108363505 A | 8/2018 |
| CN | 208172753 U | 11/2018 |

OTHER PUBLICATIONS

"Logitech Power Mouse Pad Disassembly Reveals How to Wirelessly Charge", https://kknews.cc/zh-tw/digital/ax3bag6.html, published Sep. 28, 2017, pp. 2, 8, 14.
Office Action dated Feb. 10, 2020 of the corresponding Taiwan patent No. TWI702519.

* cited by examiner

*Primary Examiner* — Hal Kaplan
(74) *Attorney, Agent, or Firm* — Chun-Ming Shih; HDLS IPR Services

(57) ABSTRACT

A wireless charging mousepad and processes thereof is provided. The wireless charging mousepad includes an accommodation seat with at least one groove, and a first cloth is disposed on the accommodation seat. Then a coil layer is disposed on the first cloth and placed in the groove with the first cloth. In addition, a glue layer is disposed on the first cloth and covers the groove. At last, a second cloth is disposed on the glue layer. Thereby, the coil layer will be embedded in the accommodation seat, and the wireless charging mousepad is completed.

10 Claims, 7 Drawing Sheets

WIRELESS CHARGING MOUSEPAD AND PROCESSES THEREOF

BACKGROUND OF THE INVENTION

Field of the Invention

The present invention generally relates to a mouse pad and, in particular to a wireless charging mousepad and processes thereof.

Description of Prior Art

A mouse pad is an indispensable item in computer peripherals because a mouse can have a correct movement thereon, and then an accurate moving of the cursor so that users can input various commands through the mouse.

Moreover, since a wireless mouse provides users with great convenience in operation, now a combination of wireless charging mousepad and wireless mouse is provided on the market. However, in the existing wireless charging mousepad structure, the wireless charging module is stacked directly on the mousepad so that the charging surface will be a bulge on the surface, thus the surface of the mouse pad is not at same level and the charging surface may become an obstacle while the mouse is moving thereon.

In view of the above drawbacks, the Inventor proposes the present invention based on his expert knowledge and elaborate research in order to solve the problems of prior art.

SUMMARY OF THE INVENTION

Accordingly, an object of the present invention is to provide a wireless charging mousepad and processes thereof, in which the coil layer is embedded in the accommodation seat without protruding the cloth so as to provide a practical mousepad structure.

In order to achieve the object mentioned above, the present invention provides a wireless charging mousepad including an accommodation seat, a first cloth, a coil layer, a glue layer and a second cloth. The accommodation seat has at least one groove, and the first cloth is disposed on the accommodation seat. The coil layer is disposed on the first cloth and placed in the groove with the first cloth. The glue layer is disposed on the first cloth and covers the groove. The second cloth is disposed on the glue layer.

In order to achieve the object mentioned above, the present invention provides a process of wireless charging mousepad including: providing an accommodation seat and disposing a first cloth on the accommodation seat; processing the accommodation seat provided with the first cloth to form at least one groove; providing a coil layer including at least one coil, and placing the at least one coil in the groove to form a lower semi-finished product; providing a second cloth and disposing a glue layer on the second cloth to form an upper semi-finished product; laminating the upper semi-finished product by one side of the glue layer to the coil layer of the lower semi-finished product; and performing a heat press on the laminated upper semi-finished product and lower semi-finished product, and the first cloth and the second cloth being combined so that the coil layer can be embedded in the accommodation seat.

Comparing to the prior art, the wireless charging mousepad of the present invention provides a second cloth, a glue layer, a coil layer, a first cloth and an accommodation seat disposed sequentially from bottom to top. The accommodation seat is processed to form at least one groove, and a glue layer is disposed on the coil layer. At last, the coil layer is embedded in the accommodation seat without protruding from the second cloth by a heat press. Therefore, the surface of the mouse pad is flat so as to facilitate the movement of the mouse and to increase the utility of the present invention.

BRIEF DESCRIPTION OF DRAWING

The features of the invention believed to be novel are set forth with particularity in the appended claims. The invention itself, however, may be best understood by reference to the following detailed description of the invention, which describes a number of exemplary embodiments of the invention, taken in conjunction with the accompanying drawings, in which:

DETAILED DESCRIPTION OF THE PREFERRED EMBODIMENTS

In cooperation with attached drawings, the technical contents and detailed description of the invention are described thereinafter according to a number of preferable embodiments, being not used to limit its executing scope. Any equivalent variation and modification made according to appended claims is all covered by the claims claimed by the present invention.

Figure 1:
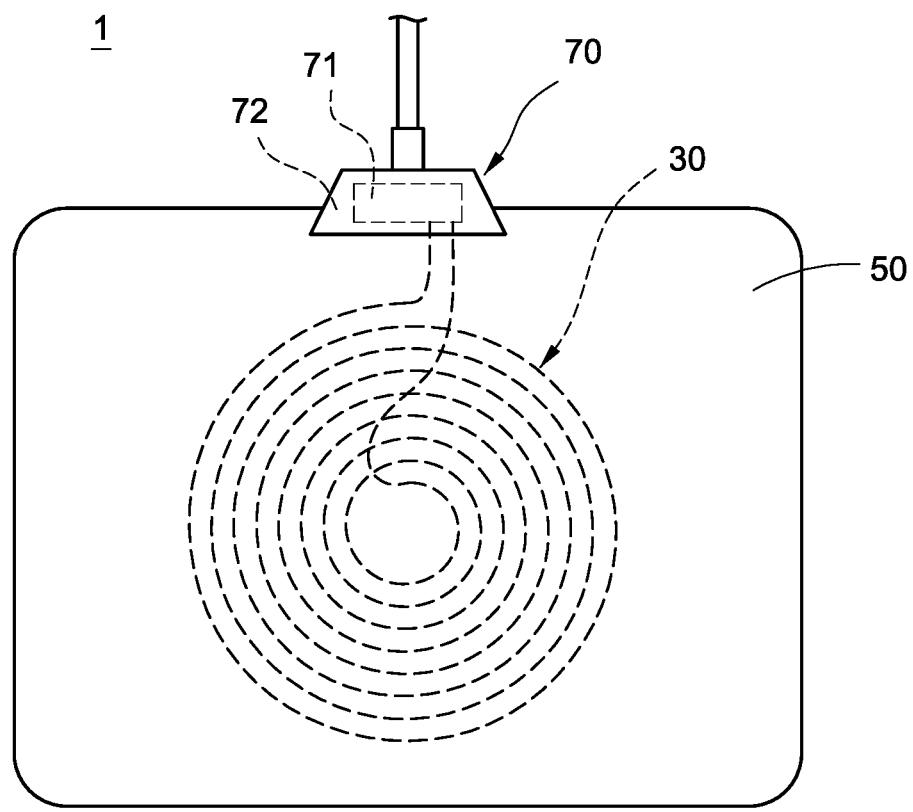
FIG. 1 is a top view of the wireless charging mousepad of the present invention.
Figure 2:
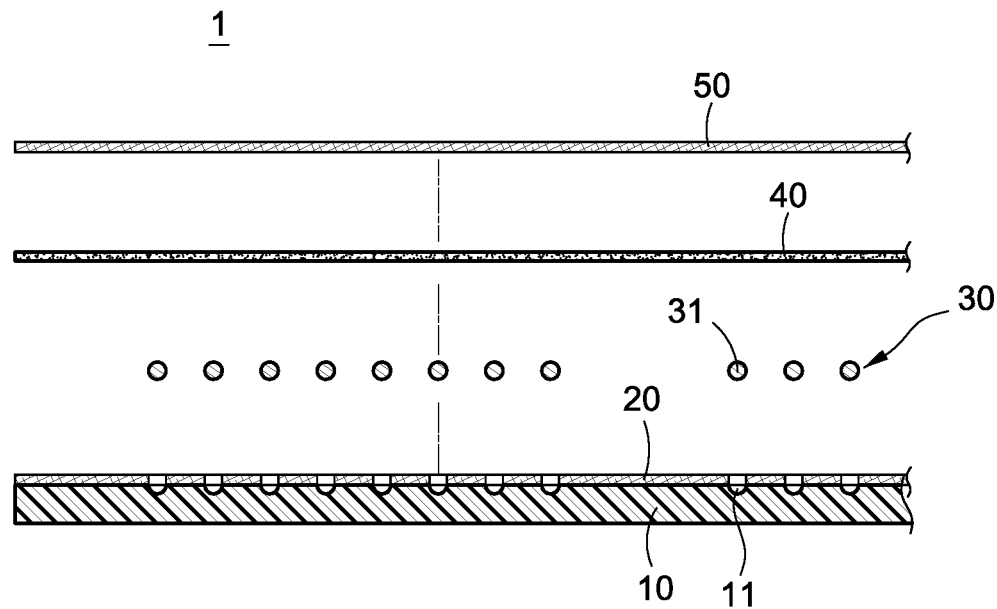
FIG. 2 is an explosion of cross-sectional view of the wireless charging mousepad of the present invention.

Please refer to FIG. 1 and FIG. 2, which depict a top schematic view and an explosion of cross-sectional view of wireless charging mousepad of the present invention. The present invention provides a wireless charging mousepad 1 including a second cloth 50, a glue layer 40, a coil layer 30, a first cloth 20 and an accommodation seat 10 disposed sequentially from bottom to top to form the wireless charging mousepad 1. More detail descriptions of the wireless charging mousepad 1 are as follows.

The accommodation seat 10 is, preferably, a rubber seat or a silicon seat. The accommodation seat 10 is the base of the wireless charging mousepad 1 and has at least one groove 11.

The first cloth 20 is disposed on the accommodation seat 10, and the first cloth 20 is a cloth for combination. In the present embodiment, the accommodating seat 10 is processed together with the first cloth 20, such as laser engraving, cutting or hot melting etc. In the present embodiment, the accommodation seat 10 is formed by laser engraving 2 to form the groove 11.

Furthermore, the coil layer 30 is disposed on the first cloth 20. The coil layer 30 includes a plurality of induction coils 31 of wireless charging; the coils 31 and the first cloth 20 are disposed together in the groove 11 of the accommodation seat 10.

The glue layer 40 is disposed on the first cloth 20 and covers the groove 11. The glue layer 40 is bonded on the accommodation seat 10 through the first cloth 20.

In addition, the second cloth 50 is disposed on the glue layer 40. Thereby, the first cloth 20 and the second cloth 50 are combined by the glue layer 40, and the coil layer 30 will be embedded in the groove 11 of the accommodation seat 10 after a heat pressing. It is worthy to note that the second cloth 50 is a cloth for a mouse moving thereon.

As shown in FIG. 1, in an embodiment of the present invention, the wireless charging mousepad 1 further includes a connection module 70. The connection module 70 includes a circuit board 71 electrically connected with the coil layer 30 and a connector 72 combined with the circuit board 71. An external power can supply power to the circuit board 71 and the coil layer 30 through the connector 72.

The wireless charging mousepad 1 of the present invention can embed the coil layer 30 in the accommodation seat 10 without protruding from the second cloth 50.

Figure 3A:
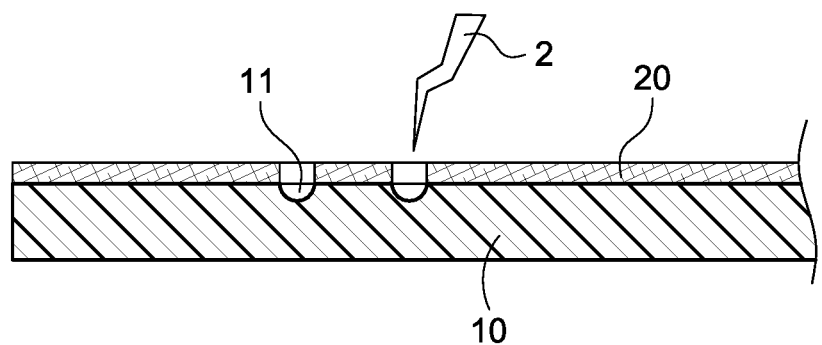
FIG. 3A to FIG. 3D are process schematic views of the wireless charging mousepad of the present invention.
Figure 3B:
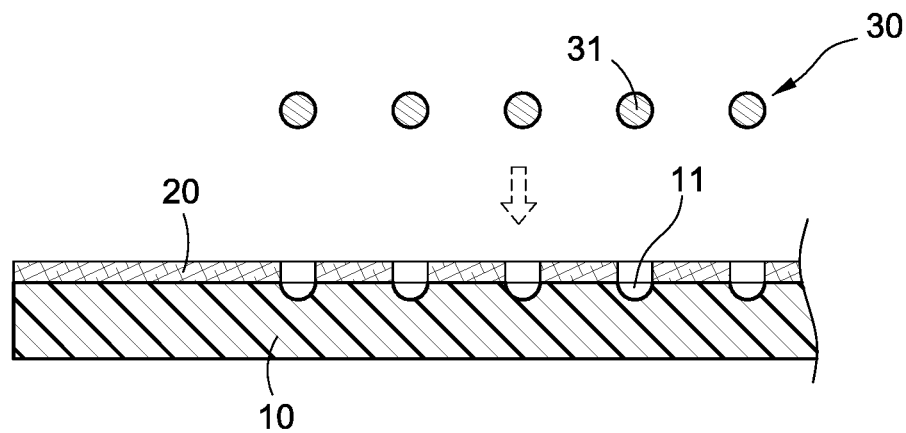

Please further refer to FIG. 3A and FIG. 3B, which depict process schematic views of wireless charging mousepad of the present invention. As shown in figures, the processes of wireless charging mousepad of the present invention are as follows. The processes include providing an accommodation seat 10 and disposing a first cloth 20 on the accommodation seat 10 firstly, and then the accommodation seat 10 provided with the first cloth 20 is processed to form at least one groove 11, such as laser engraving, cutting or hot melting etc. Next, a coil layer 30 including at least one coil 31 is provided, and the coil 31 is placed in the groove 11 to form a lower semi-finished product.

Figure 3C:
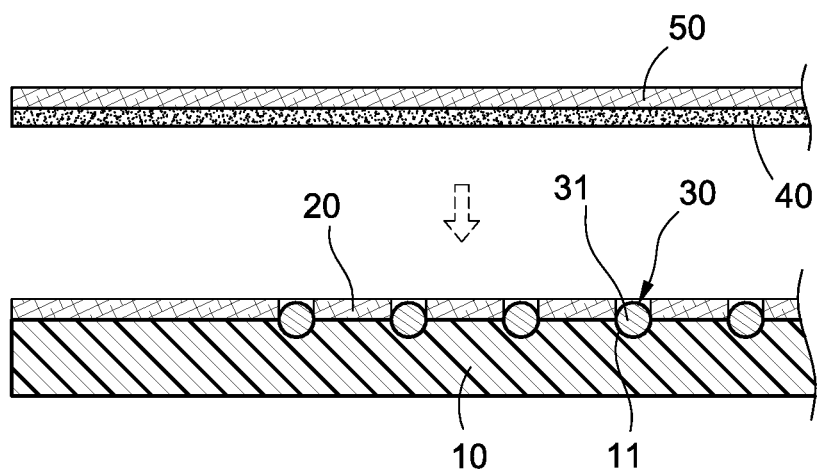
Figure 3D:
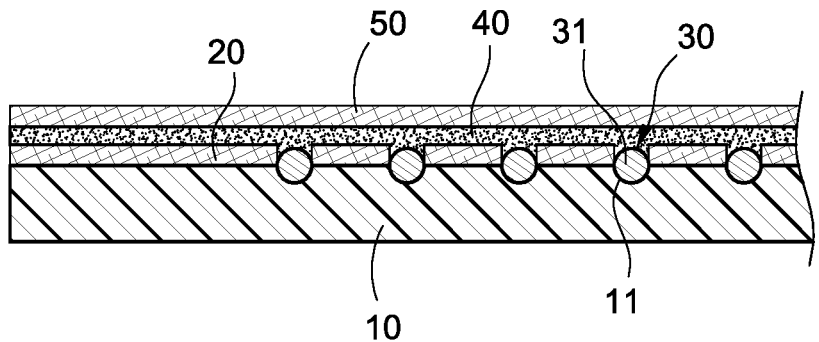

FIG. 3C and FIG. 3D depict process schematic views of wireless charging mousepad of the present invention. On the other hand, as shown in FIG. 3C, the processes also include providing a second cloth 50 and disposing a glue layer 40 on the second cloth 50 to form an upper semi-finished product.

And then, please refer to FIG. 3D, the upper semi-finished product is laminated by the side of the glue layer 40 to the coil layer 30 of the lower semi-finished product. At last, a heat press is performed to the laminated upper semi-finished product and the lower semi-finished product so that the first cloth 20 and the second cloth 50 are combined through the glue layer 40. Thus, the coil 31 can be embedded in the accommodation seat 10 without protruding from the second cloth 50.

Figure 4:
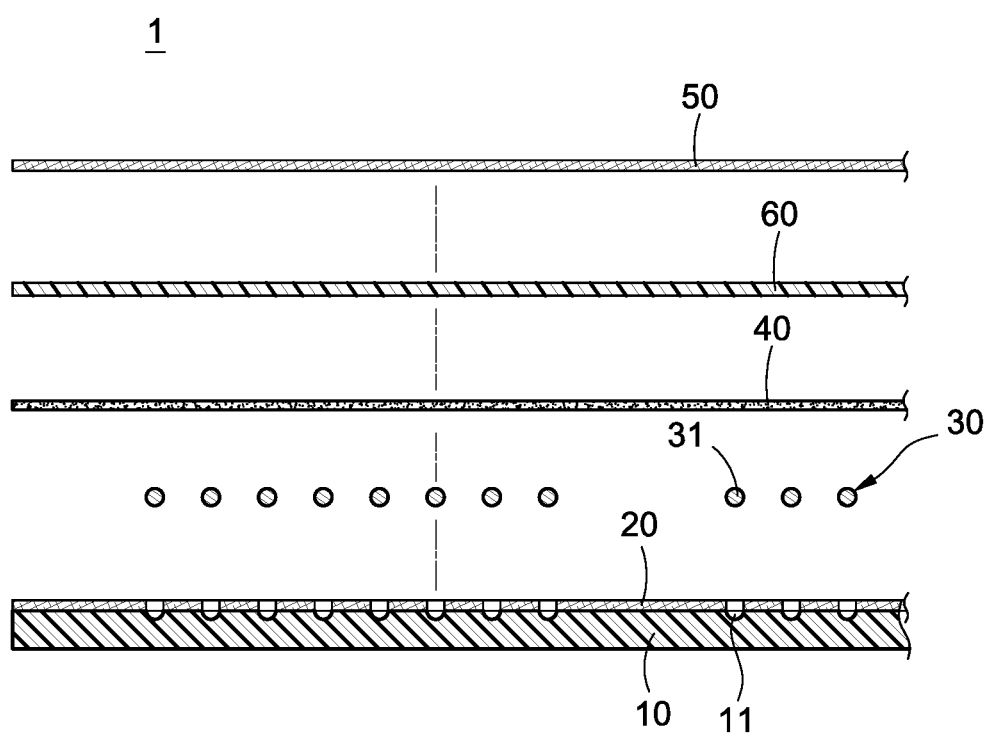
FIG. 4 is another embodiment of the wireless charging mousepad of the present invention.

Please refer to FIG. 4, it depicts a top view of another embodiment of the wireless charging mousepad of the present invention. Another thing to be noted is, in the wireless charging mousepad 1 of the present invention, when the second cloth 50 is thin, it has a fine texture in use with a low friction. Besides, the glue layer 40 is easily infiltrated to the second cloth 50 to damage the surface.

In the above condition, the wireless charging mousepad 1 can further include an isolation layer 60, and the isolation layer 60 can be made of polyurethane (PU) or acryl. As shown in FIG. 4, which depicts another embodiment of wireless charging mousepad of the present invention, the isolation layer 60 is disposed between the second cloth 50 and the glue layer 40. Furthermore, the process is to dispose the isolation layer 60 on the second cloth 50, and then the glue layer 50 is disposed thereon.

Figure 5:
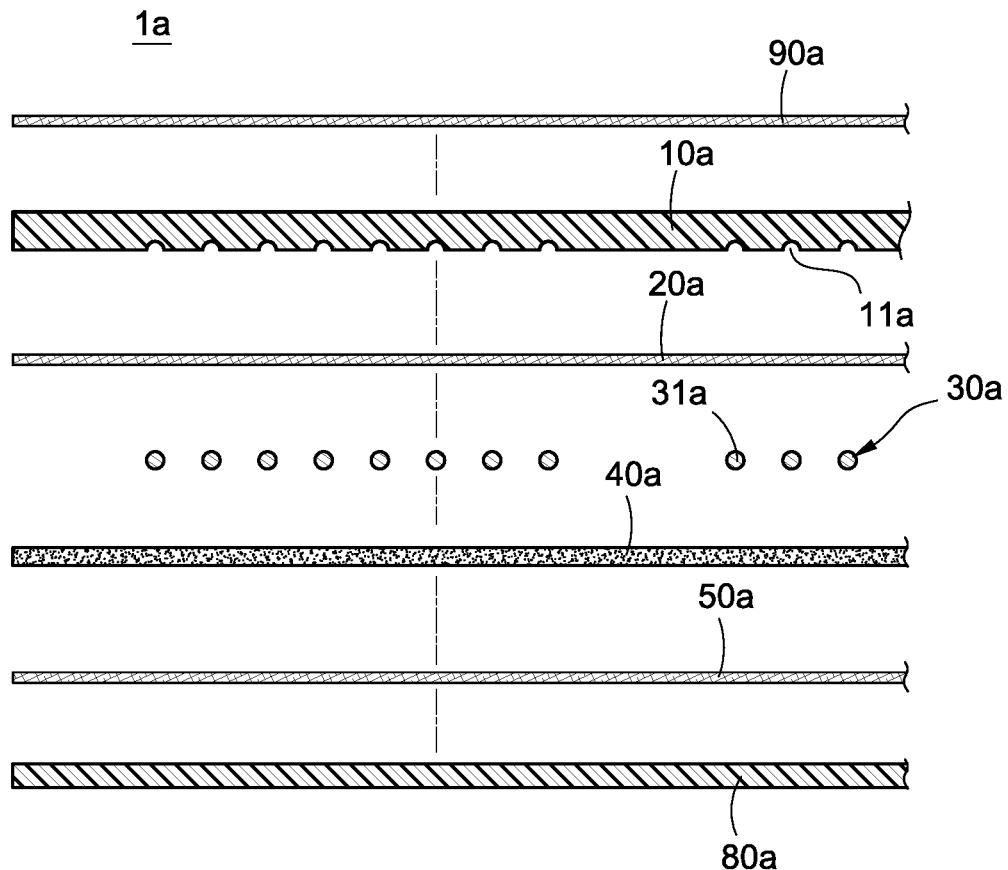
FIG. 5 is an explosion of cross-sectional view of the wireless charging mousepad of another embodiment of the present invention.

Please refer to FIG. 5, it depicts an explosion cross sectional view of a further embodiment of the wireless charging mousepad. In the present embodiment, the wireless charging mousepad 1a includes a third cloth 90a, an accommodation seat 10a, a second cloth 50a, a glue layer 40a, a coil layer 30a, a first cloth 20a and a bottom seat 80a disposed sequentially from bottom to top, wherein the accommodation seat 10a has at least one groove 11a; the coil layer 30a includes at least one coil 31a.

Later, the above wireless charging mousepad 1a will perform a heat press, and then the first cloth 20a and the second cloth 50a are combined by the glue layer 40a. Thereby, the coil layer 30a will be embedded in the accommodation seat 10a without protruding from the second cloth 50a.

Figure 6A:
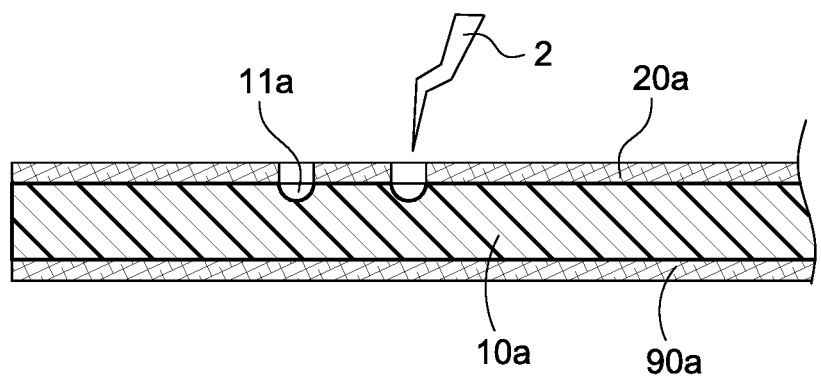
FIG. 6A to FIG. 6D are another process schematic views of the wireless charging mousepad of the present invention.
Figure 6B:
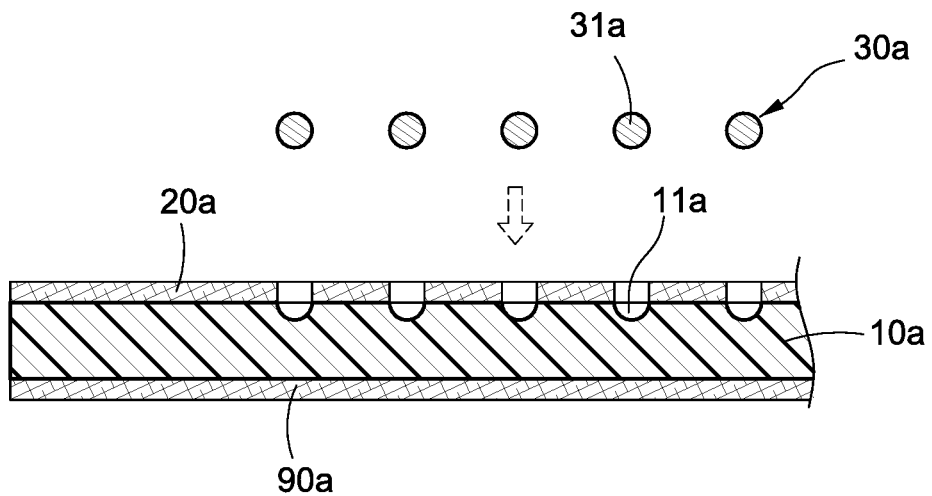

FIG. 6A and FIG. 6B depict process schematic views of wireless charging mousepad of the present invention. The processes of the wireless charging mouse pad 1 in FIG. 5 described above are as follows. The processes include providing an accommodation seat 10a and disposing a first cloth 20a on the accommodation seat 10a firstly, and then the accommodation seat 10a provided with the first cloth 20a is processed to form at least one groove 11a, such as laser engraving, cutting or hot melting etc. Next, a third cloth 90a is provided to be disposed at an outer side (the other side with respect to the groove 11a) of the accommodation seat 10a. Next, a coil layer 30a including at least one coil 31a is provided, and the coil 31a is placed in the groove 11a to form a lower semi-finished product.

Figure 6C:
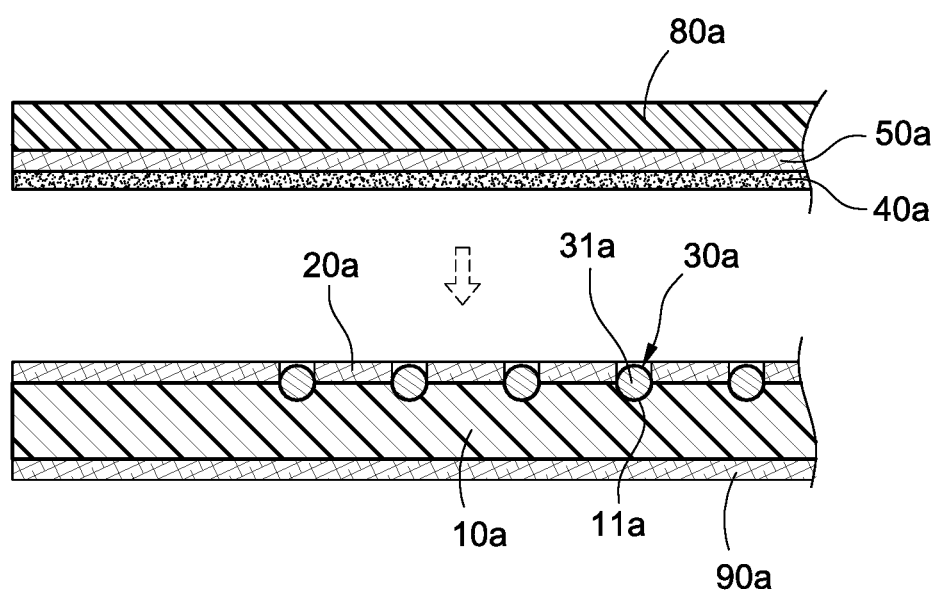
Figure 6D:
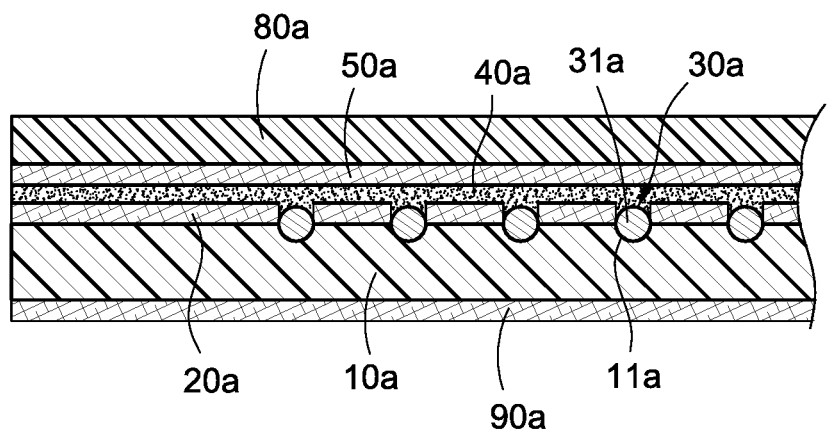

FIG. 6C and FIG. 6D depict process schematic views of wireless charging mousepad of the present invention. As shown in FIG. 6C, the processes also include providing a second cloth 50a and disposing a glue layer 40a on the second cloth 50a. A bottom seat 80a is provided. The bottom seat 80a is a rubber seat or a silicon seat, and the bottom seat 80a is disposed at an outer side of the second cloth 50a to form an upper semi-finished product.

Please refer to FIG. 6D, the upper semi-finished product is laminated by the side of the glue layer 40a to the coil layer 30a of the lower semi-finished product. A heat press is performed to the laminated upper semi-finished product and the lower semi-finished product. Thus, the first cloth 20a and the second cloth 50a are combined by the glue layer 40a. In addition, a heat press is performed to the laminated upper semi-finished product and the lower semi-finished product so that the glue layer 40a is melted by heat and flows into the groove 11a.

Figure 7:
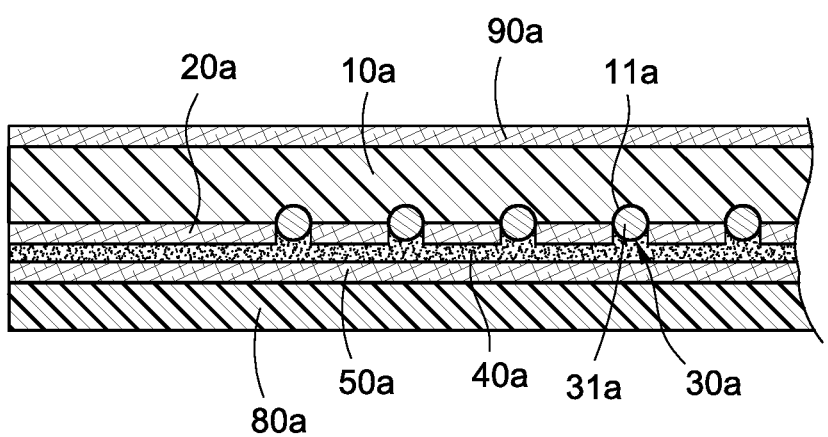
FIG. 7 is a cross sectional view of the wireless charging mousepad of another embodiment of the present invention.

Please also refer to FIG. 7, it depicts a cross sectional view of the wireless charging mousepad of the present invention. As shown in the figure, the third cloth 90a of the wireless charging mousepad 1a is, preferably a multi-spandex, a cloth for a mouse moving thereon.

Moreover, the bottom seat 80a is the base of the wireless charging mousepad 1a, wherein the glue layer 40a covers the coil 31a, and the coil 31a is embedded in the accommodation seat 10a without protruding from the second cloth 50a.

Although the present invention has been described with reference to the preferred embodiment thereof, it will be understood that the invention is not limited to the details thereof.

Various substitutions and improvements have been suggested in the foregoing description, and others will occur to those of ordinary skill in the art. Therefore, all such substitutions and improvements are intended to be embraced within the scope of the invention as defined in the appended claims.

What is claimed is:

1. A wireless charging mousepad, comprising:
   an accommodation seat having at least one groove;
   a first cloth disposed on the accommodation seat;
   a coil layer disposed on the first cloth and placed in the at least one groove with the first cloth;

a glue layer disposed on the first cloth and covering the groove; and a second cloth disposed on the glue layer.

2. The wireless charging mousepad according to claim 1, wherein the accommodation seat is a rubber seat or a silicon seat, and the accommodation seat is processed by laser engraving, cutting or hot melting to form the groove.

3. The wireless charging mousepad according to claim 1, further including a connection module, wherein the connection module includes a circuit board electrically connected with the coil layer and a connector combined with the circuit board.

4. The wireless charging mousepad according to claim 1, further including an isolation layer, wherein the isolation layer is made of polyurethane or acryl, and the isolation layer is disposed between the second cloth and the glue layer.

5. The wireless charging mousepad according to claim 1, further including a third cloth disposed at an outer side of the accommodation seat.

6. The wireless charging mousepad according to claim 5, further including a bottom seat disposed at an outer side of the second cloth, wherein the bottom seat is a rubber seat or a silicon seat.

7. A process for making a wireless charging mousepad, including:

providing an accommodation seat and disposing a first cloth on the accommodation seat;

processing the accommodation seat provided with the first cloth to form at least one groove;

providing a coil layer including at least one coil, and placing the at least one coil in the groove to form a lower semi-finished product;

providing a second cloth and disposing a glue layer on the second cloth to form an upper semi-finished product;

laminating the upper semi-finished product by one side of the glue layer to the coil layer of the lower semi-finished product; and performing a heat press on the laminated upper semi-finished product and lower semi-finished product, and the first cloth and the second cloth being combined through the glue layer so that the coil layer can be embedded in the accommodation seat.

8. The process for making a wireless charging mousepad according to claim 7, further including providing an isolation layer, wherein the isolation layer is disposed on the second cloth firstly, and then the glue layer is disposed thereon.

9. The process for making a wireless charging mousepad according to claim 7, further including providing a bottom seat, wherein the bottom seat is a rubber seat or a silicon seat which is disposed at an outer side of the second cloth.

10. The process for making a wireless charging mousepad according to claim 7, further including of providing a third cloth disposed at an outer side of the accommodation seat.

* * * * *